United States Patent
LaFleur (10) Patent No.: US 7,134,419 B2
(45) Date of Patent: Nov. 14, 2006

(54) OIL FLUSHING SYSTEM

(76) Inventor: Phil LaFleur, 18 B Cherry La., Scituate, MA (US) 02066

( * ) Notice: Subject to any disclaimer, the term of this patent is extended or adjusted under 35 U.S.C. 154(b) by 188 days.

(21) Appl. No.: 10/875,702

(22) Filed: Jun. 24, 2004

(65) Prior Publication Data

US 2004/0261748 A1    Dec. 30, 2004

Related U.S. Application Data

(60) Provisional application No. 60/482,113, filed on Jun. 24, 2003.

(51) Int. Cl.
*F01M 1/00*    (2006.01)
(52) U.S. Cl. .................. 123/196 R; 184/109
(58) Field of Classification Search ............ 123/196 R, 123/198 C; 184/109, 26, 27.2
See application file for complete search history.

(56) References Cited

U.S. PATENT DOCUMENTS

| 4,433,656 A | 2/1984 | Norwood, Sr. |
|---|---|---|
| 4,479,468 A | 10/1984 | Norwood, Sr. |
| 5,044,334 A | 9/1991 | Bedi |
| 5,062,398 A * | 11/1991 | Bedi et al. ............... 123/196 R |
| 5,090,376 A * | 2/1992 | Bedi ..................... 123/196 R |
| 5,094,201 A * | 3/1992 | Bedi ..................... 123/196 R |
| 5,154,775 A * | 10/1992 | Bedi ......................... 134/22.1 |
| 5,327,862 A | 7/1994 | Bedi |
| 5,443,138 A | 8/1995 | Bedi et al. |
| 5,474,098 A | 12/1995 | Grigorian et al. |
| 5,566,781 A | 10/1996 | Robert et al. |
| 5,743,358 A | 4/1998 | Bedi et al. |
| 6,089,205 A | 7/2000 | Grigorian et al. |
| 6,298,947 B1 | 10/2001 | Flynn |

* cited by examiner

*Primary Examiner*—Tony M. Argenbright
*Assistant Examiner*—Katrina B. Harris
(74) *Attorney, Agent, or Firm*—Wolf, Greenfield & Sacks, P.C.

(57) ABSTRACT

Methods and apparatus to flush residual used oil from the lubrication system of an engine during an oil change. The method includes draining used oil from a tank of the lubrication system and then adding fresh oil to the tank. An adaptor or fitting is used to provide an outlet in the lubrication system to flush any residual used oil that may not have been drained along with used oil in the oil tank. The engine may be started such that a scavenging pump of a lubrication system pumps residual used oil out of the system through the outlet. Once a user observes that residual used oil has been substantially flushed from the system, the engine is stopped to terminate the flushing process.

27 Claims, 7 Drawing Sheets

OIL FLUSHING SYSTEM

RELATED APPLICATION

This application claims the benefit of U.S. Provisional Patent Application No. 60/482,113, filed on Jun. 24, 2003, which is hereby incorporated by reference in its entirety.

FIELD OF INVENTION

The present invention relates to an apparatus and method for flushing oil that may otherwise remain in the lubrication system of an engine when oil is changed. In particular, it relates to flushing oil from internal combustion engines with a pump that is used to pump oil through a lubrication system of the engine during normal engine operation.

BACKGROUND OF INVENTION

Routine oil changes in internal combustion engines are known to prolong engine life by maintaining oil in a condition to better protect moving components of an engine. After extended use, engine oil is often broken down by exhaust gasses that escape the combustion chambers of an engine and then contact the engine oil. These gasses can cause the oil to break down from its original state and thus reduce the amount of protection the oil can offer to the engine.

It is known in the prior art to regularly change engine oil to remove used, broken down oil and replace it with fresh oil in order to protect an engine. In particular, it is known in the prior art to accomplish this by draining the oil from an oil tank and/or pan, refilling the oil tank and/or pan, and replacing the oil filter. However, this method can leave residual used oil in various portions of a lubrication system that are not readily drained. Such used oil can then mix with fresh oil that has been refilled into the engine. Mixing of the used oil with the fresh oil can cause the fresh oil to break down faster than it would otherwise. This mixing can also alter the characteristics of the fresh oil and thus reduce the amount of protection that the fresh oil can provide to the engine.

Many internal combustion engines have either a wet sump lubrication system or a dry sump lubrication system to circulate oil to various components in the engine for lubrication and cooling. A wet sump engine may have an oil pan located near a lower most portion of the engine for collecting and retaining the oil that is circulated throughout the engine during operation. An oil pump is used to draw oil from the oil pan and direct it through internal passageways within the engine, typically including passageways in the engine block and the cylinder head. These passageways deliver the oil to locations in the engine that require lubrication and/or cooling. For example, oil may be delivered to the pistons, valves, bearings, gears, and other components having parts that move relative to one another requiring lubrication and/or cooling. Once the oil has been delivered to these components it is returned, typically by gravity, back to the oil pan for recirculation throughout the engine.

Dry sump lubrication systems differ from wet sump systems in that much of the oil is retained in an oil tank that is remote from the oil pan and may even be remote from the engine itself. In these systems, oil is drawn from the oil tank and is pumped through internal passageways of the engine by a primary oil pump to reach the components that may require cooling or lubrication. Like in wet sump systems, the oil may be allowed to return to the oil pan, via gravity, once it has lubricated or cooled the appropriate component. However, an additional oil pump, often called a scavenging pump, draws the engine from the oil pan and delivers it back to the oil tank for subsequent recirculation by the primary oil pump. In this manner, a minimal amount of oil is retained in the oil pan or the 'dry sump'. In such dry sump systems, the oil may be filtered when it is passed from the oil pan to the oil tank. However, some dry sump engines may filter the oil between the primary oil pump and the passageways of the engine or at other points within the lubrication system in addition to, or in place of filtering the oil in between the dry sump and the oil tank.

SUMMARY OF INVENTION

The device and methods of the present invention are designed to remove residual used oil that may otherwise remain in the lubrication system of an engine during an oil change. Moreover, the device and the methods described herein allow residual used oil to be removed with the pumps normally used for pumping oil through a dry sump, internal combustion engine.

According to one aspect of the invention, a method is provided to remove residual used oil from a lubrication system of an engine having a primary oil pump and a scavenging oil pump. The method comprises the acts of draining used oil from an oil tank of the lubrication system and adding fresh oil to the oil tank. The method also comprises pumping the fresh oil through the lubrication system with the primary oil pump to flush residual used oil from the lubrication system and into a dry sump of the engine. Also, residual used oil is pumped from the dry sump out of the engine with the scavenging oil pump.

According to another aspect of the invention, a method is provided to retrofit a lubrication system having an oil line adapted to deliver oil from a dry sump of an engine to an oil tank. The method comprises acts of removing an original fitting that provides a connection between the oil line and a port in the lubrication system, connecting a first end of a replacement fitting having a separable joint to the oil line, and connecting a second end of the replacement fitting to the port to retrofit the lubrication system.

According to still another aspect of the invention, a kit of parts is provided to retrofit an engine. The kit comprises a first fitting having a separable joint to provide an outlet from a lubrication system of the engine, a bypass adaptor to mount to an oil filter housing of the engine, a second fitting to direct flushed oil away from the engine, and a drain line to direct flushed oil into a waste receptacle.

According to another aspect of the invention, an adaptor provides an outlet to allow residual used oil to be pumped out of a lubrication system of an engine. The adaptor comprises a central mounting hole having internal threads configured to mate with a threaded protrusion of an oil filter housing on the engine. The adaptor also comprises a plurality of outlets disposed about the central mounting hole and extending completely through the adaptor in a direction parallel to the central mounting hole, wherein each of the plurality of outlets has internal threads to accept a plug or fitting.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings:

FIG. 7a is an end view of the bypass adaptor shown in FIG. 6a; and

FIG. 7b is a side view of the bypass adaptor shown in FIG. 6a.

DETAILED DESCRIPTION

Embodiments of the present invention include an adaptor, fittings, or methods to remove residual used oil that may otherwise remain in the lubrication system of an engine when the engine oil is changed. Additionally, the adaptor, fittings, or methods allow residual oil to be removed through the use of a pump that is normally used to pump oil through the lubrication system during engine operation.

In one embodiment, used oil is first drained from an oil tank of an engine having a dry sump lubrication system and a used oil filter is removed. As is to be appreciated, residual oil may remain in various portions of the lubrication system. For example, residual oil may remain in the dry sump, the supply line from the oil tank to the primary oil pump, or passageways in the engine itself at points downstream from the primary oil pump. It may be desirable to remove this residual used oil during an oil change.

In one embodiment, an outlet may be placed at a position of the lubrication system that is downstream from the residual used oil, yet upstream of the new oil that has been placed in the oil tank. In this regard, when the engine is started, the residual oil may be pushed through the system and directed through the outlet to flush it from the engine. As is to be appreciated, many engines having dry sump lubrication systems have an oil filter housing located just downstream of a scavenging pump, and thus downstream of much of the residual used oil. In this regard, an adaptor may be configured to provide an outlet at the oil filter housing to flush residual used oil from the lubrication system by running the scavenging pump.

Embodiments of the present invention may also use fittings to provide an outlet at a position upstream of new oil in the oil tank and downstream of the residual used oil. As is to be appreciated, some engines with dry sump lubrication systems may not have on oil filter housing positioned just downstream from the residual used oil and also upstream of new oil in the oil tank. In such systems, a fitting may be used to provide an outlet at a port that is just downstream from the residual used oil such that a scavenging pump can be operated to flush residual used oil from the lubrication system.

Figure 1:
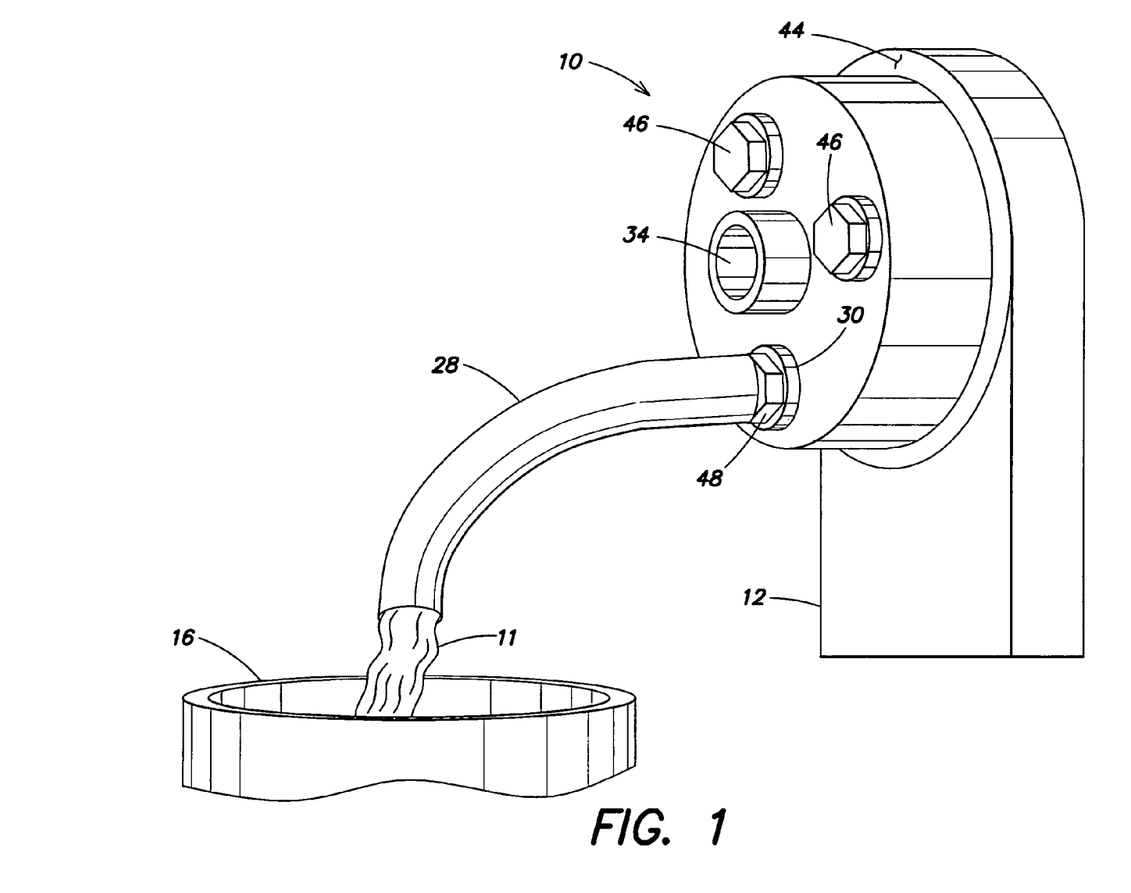
FIG. 1 is a perspective view of an adaptor mounted to an oil filter housing of an engine to flush residual used oil, according to one embodiment of the invention.
Figure 2:
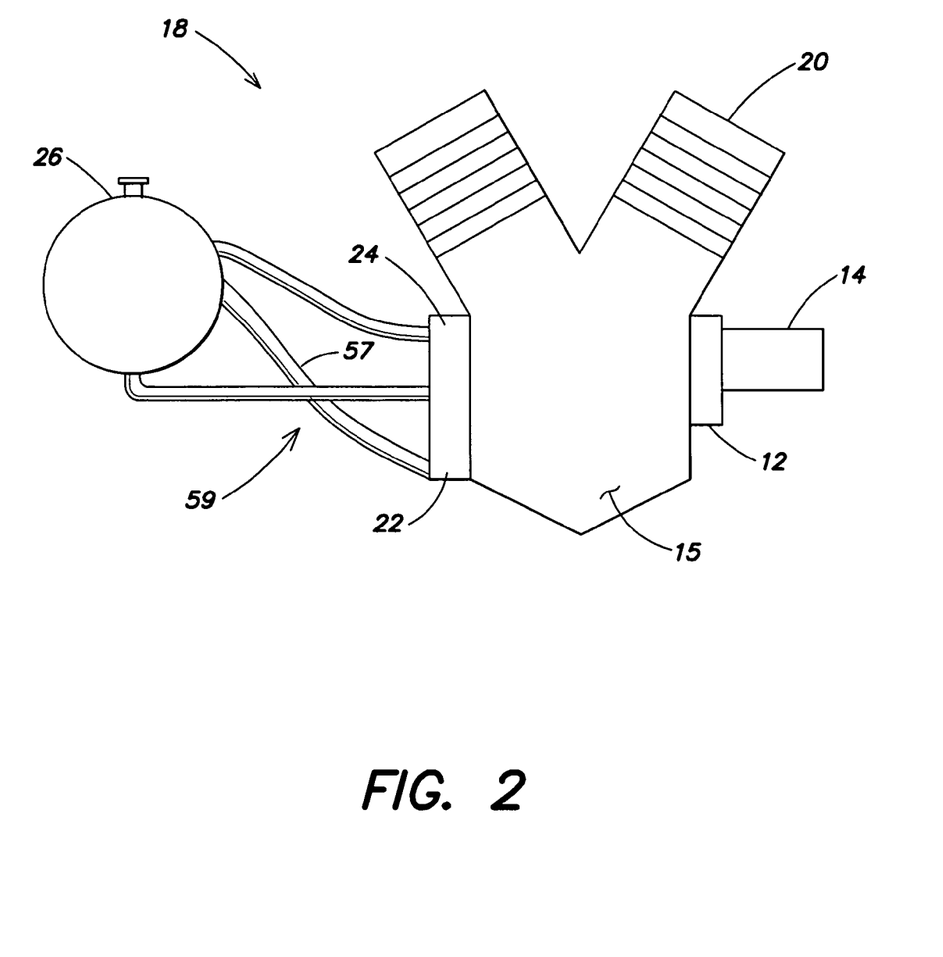
FIG. 2 is a schematic view of one dry sump engine lubrication system having an oil filter housing positioned between an oil scavenging pump and an oil tank.

Turning now to the Figures, and in particular FIG. 1, which shows an embodiment of an adaptor 10 attached to an oil filter housing 12. As shown, the adaptor may replace an oil filter 14 during an oil change to direct oil received from the oil filter housing to a waste receptacle 16. In this regard, residual used oil 11 may be flushed from the lubrication system 18 through the adaptor 10 during an oil change. As described above, the adaptor of FIG. 1 may be used with an engine 20 having a lubrication system with an oil filter housing positioned between a scavenging pump 22 and a remote oil tank 26, as illustrated in FIG. 2. However, the present invention is not limited in this regard, as other adaptors may be used to practice aspects of the invention on such lubrication systems. Additionally, the adaptor of FIG. 1, or other adaptors may be used with lubrication systems that differ from the system shown in FIG. 2.

Illustrative embodiments of the invention may include features to help direct flushed oil to a waste receptacle 16. For example, FIG. 1 shows a hose 28 attached to an outlet 30 of the adaptor 10 as a drain line so that the oil being flushed from the system can be directed to a waste receptacle 16 with minimal spillage. It is to be appreciated that this may be accomplished by other features, such as rigid tubing and the like as aspects of the invention are not limited to hoses for directing flushed oil. Still, other embodiments may not include features to direct flushed oil to a waste receptacle as the present invention is not limited in this regard.

In one illustrative embodiment, the drain line or adaptor may include features to allow a user to recognize when much of the residual used oil 11 has been flushed from the system 18. For example, the drain line 28 connected to the adaptor of FIG. 1 may comprise a clear hose. In this regard, a user may watch as dark, used oil 11 is flushed from the system and may also witness when fresh, relatively translucent oil begins to be flushed from the system. The presence of fresh oil may signal the user to stop the flushing process by turning off the engine 20, and thus the oil pump(s) 22, 24 used to move oil through the system.

Figure 3:
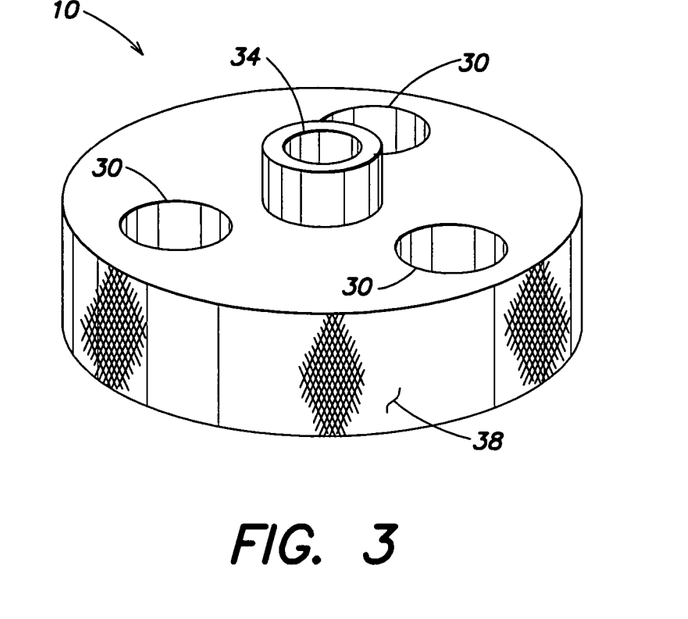
FIG. 3 is perspective view of the adaptor shown in FIG. 1.
Figure 4:
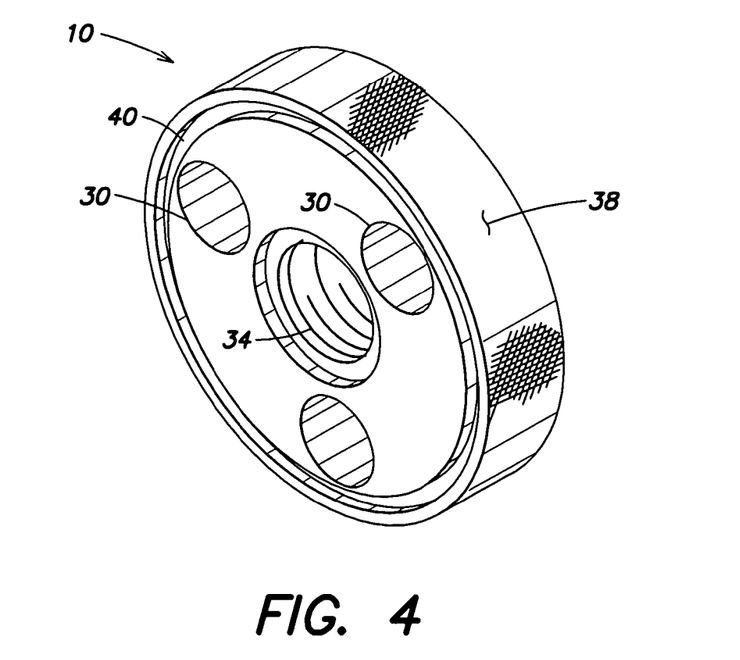
FIG. 4 is another perspective view of the adaptor shown in FIG. 1.

As shown in FIGS. 3 and 4, embodiments of the adaptor may be constructed to have mating features similar to those of a typical oil filter 14. For example, the adaptor 10 may be mounted to an oil filter housing 12 by aligning a central mounting hole 34 with a threaded protrusion on the oil filter housing, much like a standard oil filter. After alignment, the adaptor 10 may be rotated about the protrusion until it sealingly mates with a corresponding surface 44 on the filter housing 12, in much the same manner as a standard oil filter 14.

As is to be appreciated, the adaptor 10 may have features to assist a user when installing or removing the adaptor. For example, as illustrated in FIGS. 3 and 4, the outer periphery 38 of the adaptor 10 may be knurled to assist a user in rotating it on and off of an oil filter housing 12. Alternatively, this surface may include flats for use with a wrench or any other features that may assist a user to install or remove the adaptor from an oil filter housing is to be appreciated by those of skill.

As is also to be appreciated, the adaptor 10 may have features to provide a fluid tight seal with the oil filter housing. By way of example, the adaptor may have a groove 40 configured to accept a seal to prevent leakage between the adaptor 10 and an oil filter housing 12. A seal, such as a rubber o-ring may be placed within the groove 40 so that it is compressed against a mating face of the oil filter housing when the adaptor is installed. However, it is to be appreciated that other sealing devices, such as gaskets and the like may be used, or sealing devices may be eliminated altogether as the invention is not limited in this respect.

As shown in FIG. 1, illustrative embodiments of the adaptor 10 may be configured to position an outlet 30 of the adaptor optimally, regardless of the installed orientation of the adaptor. For example, the adaptor 10 shown in FIGS. 1, 3, and 4 has three outlets. When the adaptor is threaded onto the oil filter housing 12, the outlet closest to the bottom of the adaptor may be left open, while the remaining outlets are closed with plugs 46. In this regard, the outlet positioned at the lowest point may be used to drain more residual oil 11 than might be possible with outlets positioned higher. One adaptor embodiment has three 3-⅜ NPT threaded parts spaced 120 degrees apart on a 1.72 inch diameter circle that may be closed with plugs having complimentary threads, or that may be engaged with fittings having complimentary threads to serve as outlets. However, it is to be appreciated, although the illustrated embodiment shows three outlets spaced evenly, that other embodiments may have any number of outlets spaced in any other manner, as the present invention is not limited in this respect. For example, one embodiment may have two outlets spaced 180 degrees apart.

Figure 5:
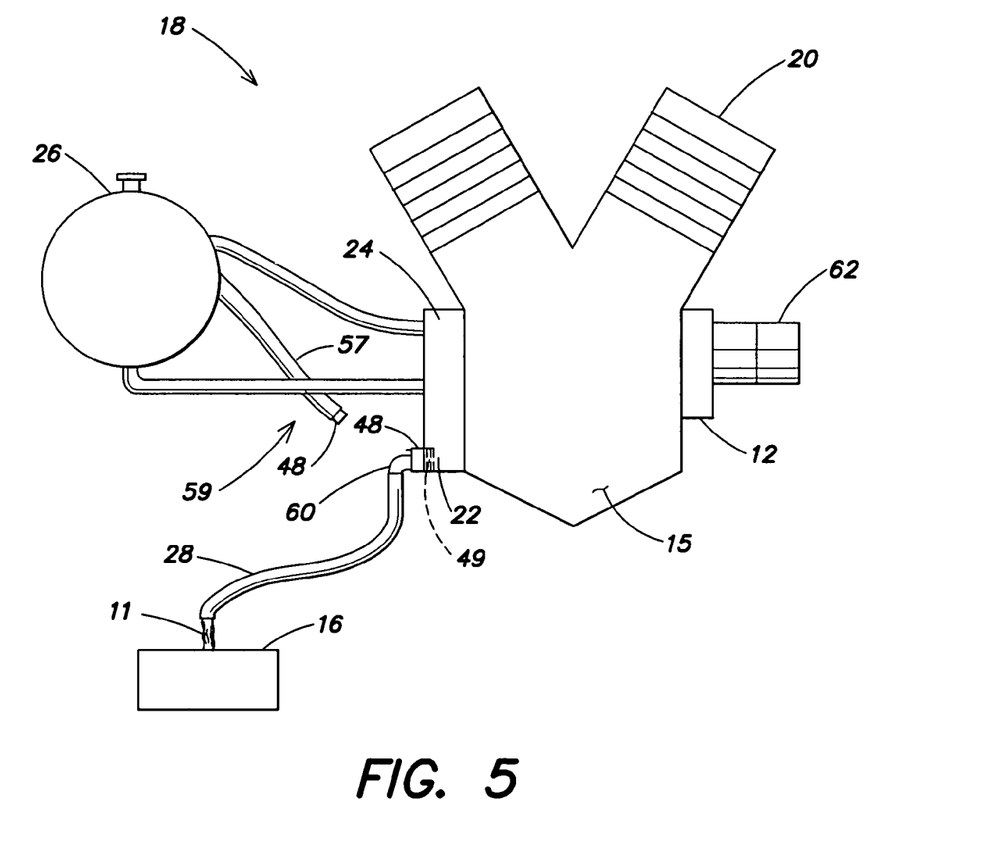
FIG. 5 is a schematic view of another dry sump engine lubrication system having an oil filter housing positioned between the primary engine oil pump and passageways of the engine and a bypass adaptor installed on the oil filter housing, the system also has a fitting installed to provide an outlet to flush residual used oil from the lubrication system according to another embodiment of the invention.

As mentioned above, some lubrication systems having a dry sump 15 may not have an oil filter housing 12 positioned just downstream from a scavenging pump 22 and also upstream from an oil tank 26. In such systems, a fitting 48 may be installed to provide an outlet 30 at a port that is just downstream from a scavenging pump 22 and thus downstream of much of the residual used oil 11 remaining in the system 18 during an oil change. For example, FIG. 5 shows such a system with a fitting 48 installed at a port 49 just downstream of the scavenging pump. Here, a drain line 28 has been attached to the fitting to help direct flushed oil toward a waste receptacle 16, similar to the drain line discussed above with respect to the embodiment of FIG. 1.

Figure 6A:
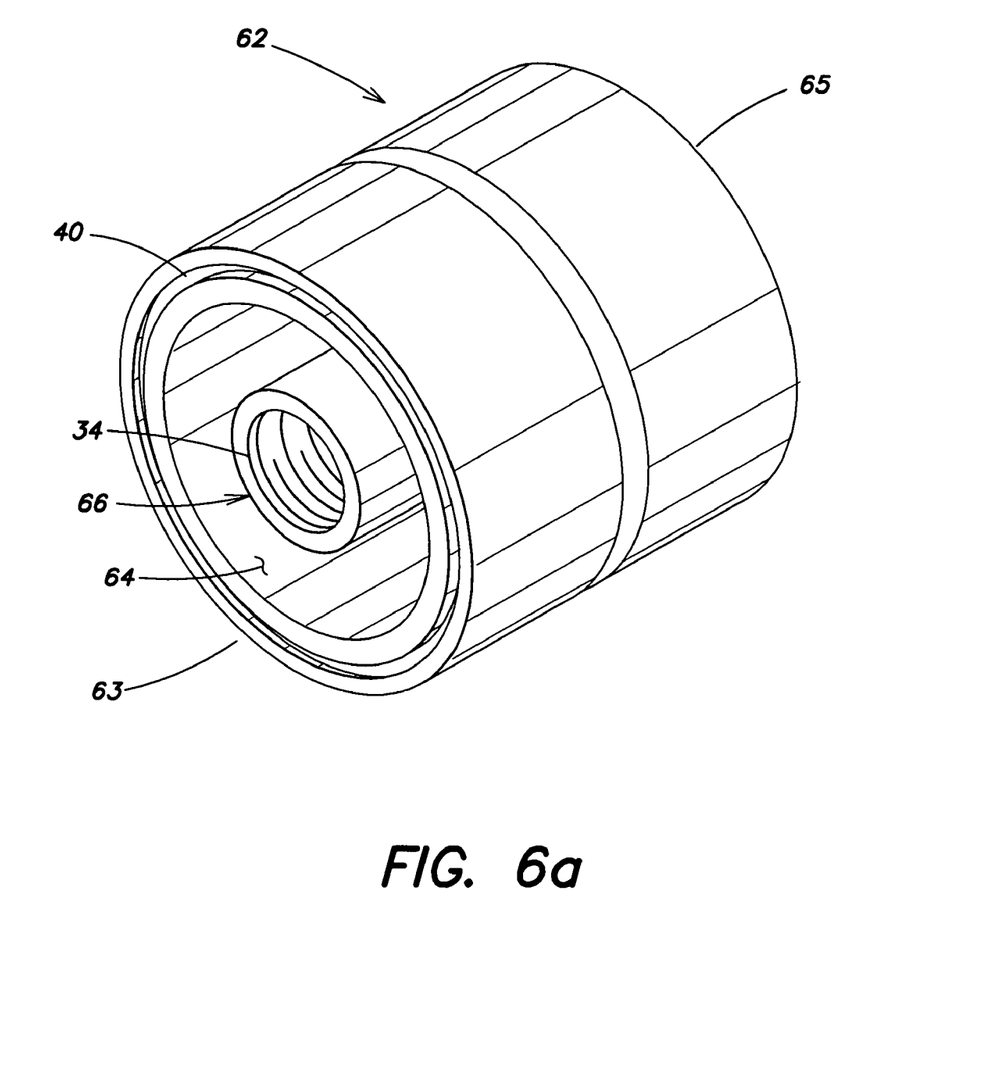
FIG. 6a is a perspective view of the bypass adaptor shown in FIG. 5.
Figure 6B:
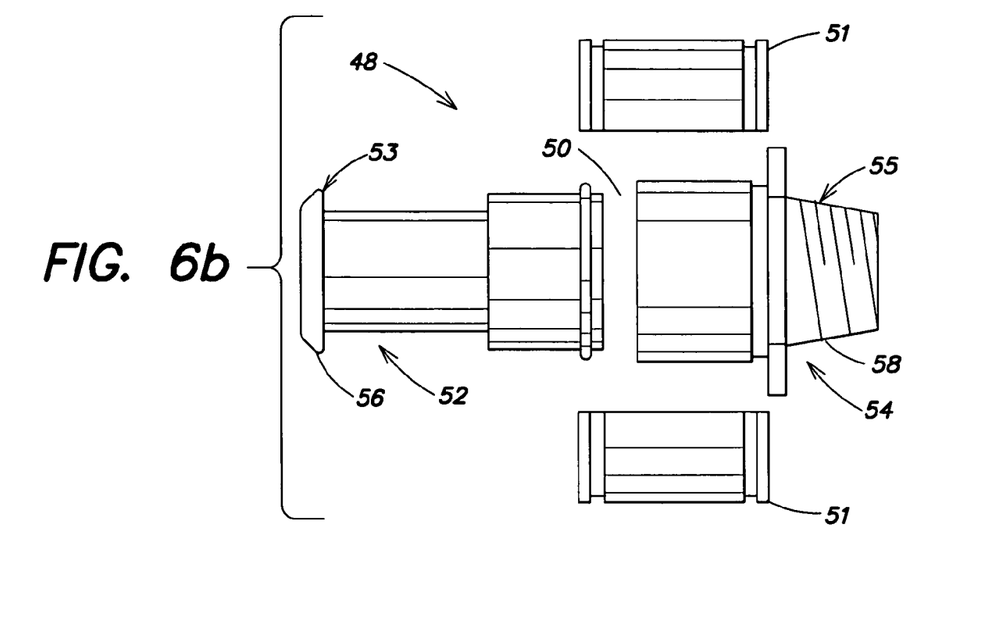
FIG. 6b is a view of a fitting having a separable joint according to one embodiment of the invention.

In one illustrative embodiment, a fitting 48 may have features to allow it to be disconnected conveniently to serve as an outlet 30 to flush oil from a system and to allow it to be reconnected to convey oil from the scavenging pump 22 to the oil tank 26 during engine operation. For example, FIG. 6b shows a fitting comprising two portions 52, 54 that have a conveniently separable joint 50. Each of the ends 53, 55 of the fitting have features adapted to mate with ports or lines in the lubrication system. For example, the first fitting portion 52 of the illustrated embodiment has a barbed hose connection 56 end that may be connected to the oil tank supply line 57 of the lubrication system 18 with a standard hose clamp. The second fitting portion 54 may have threads 58 configured to mate with complementary threads of an engine port 49. In one embodiment, these are ¼ inch NPT threads. It is to be understood that embodiments of the invention are not limited to the particular threads or configurations illustrated in FIG. 6b, as other threads or fitting configurations may be suitable for particular lubrication systems. In the embodiment illustrated in FIG. 6b, the first and second portion 52, 54 of the fitting 48 are held together by a clam shell-type arrangement. Here, each half 51 of the clam shell contacts corresponding portions of each of the first and second fitting portions to prevent the joint from separating. A spring, or other type retainer, may be used to hold the clam shell halves together with a minimal amount of force to prevent the fitting portions from separating inadvertently. Still, in other embodiments, the first and second portions of the fitting may be held together with a threaded joint, such as an Army-Navy #6 joint (AN#6), as the invention is not limited to any particular type of separable joint.

Figure 6C:
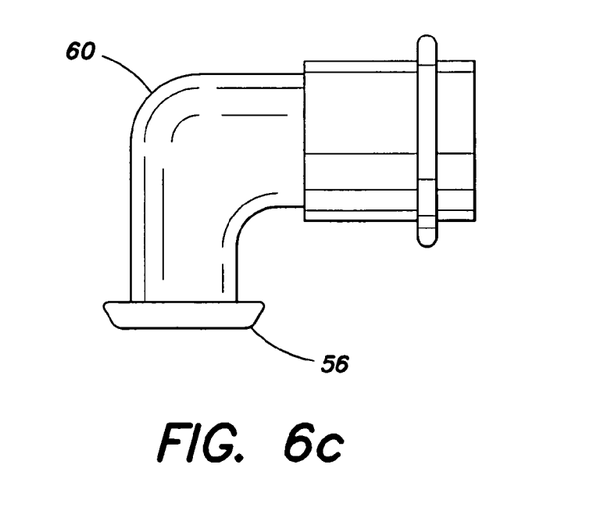
FIG. 6c is a fitting that may be used with a portion of the fitting shown in FIG. 6b to direct flushed oil away from an engine.

Other aspects of fittings 48, according to embodiments of the present invention, may help direct flushed oil away from the engine. For example, FIG. 6c shows a right angle fitting 60 that may be connected to the second portion 54 of the separable fitting during the oil flushing process. This may prove useful in directing oil away from an engine 20 that might otherwise drip onto engine components and the like. The right angle fitting may have barbed hose connection 56, as shown in FIG. 6c, to facilitate connection to as drain line, a shown in FIG. 5. However, such a fitting 60 does not have to have a barbed hose connection, or even a right angle, as the invention is not limited to the embodiment shown in FIG. 6c to direct flushed oil in a desired direction. Still, in some embodiments, such a fitting may be configured to be connected directly to a port 49 in a lubrication system without also using a fitting having a separable joint as shown in FIG. 6b.

Figure 7A:
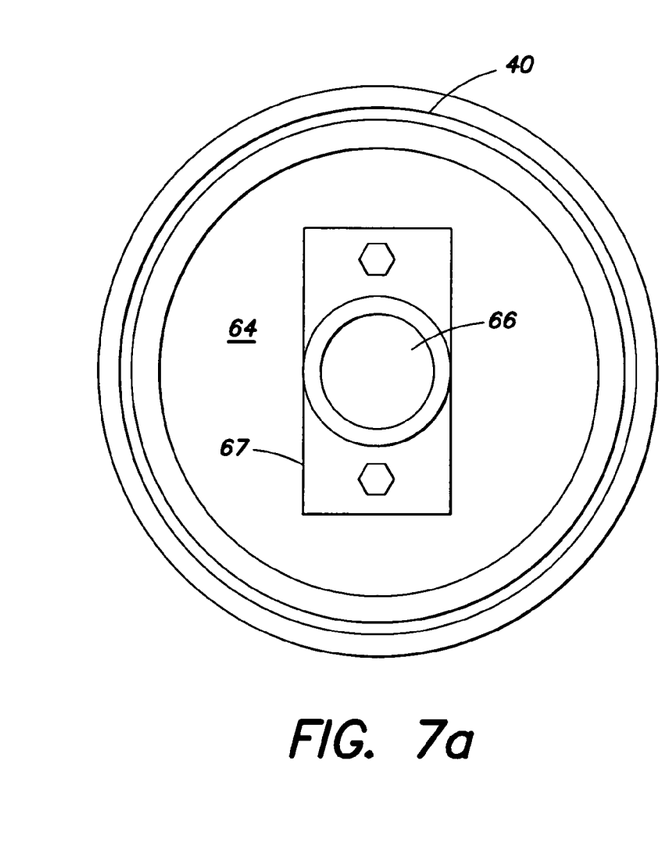
Figure 7B:
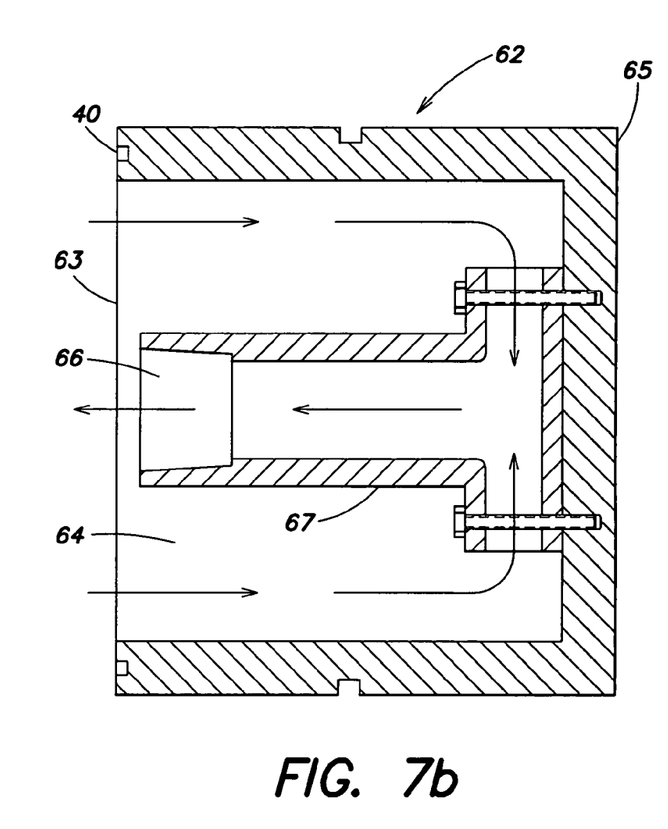

It may be desirable to bypass an oil filter 14 in lubrication systems that do not use an adaptor 10 attached to the oil filter housing 12 to provide an outlet 30 to flush residual used oil 11. As shown in FIG. 5, a bypass adaptor 62 may be installed in place of an oil filter 14 during flushing to accomplish this. FIGS. 6a, 7a, and 7b show a perspective view, and end view and a side view of one embodiment of such a bypass adaptor 62, respectively. The bypass adaptor 62 receives oil, through an inlet port 64, that would normally be delivered to an oil filter and returns the oil back to the oil filter housing through a central oil return port 66. In this manner, the bypass adaptor 62 may be used to replace an oil filter during the flushing procedure by maintaining a continuous path in the lube oil system. However, it is to be understood that the oil filter may be left in place during the flushing procedure as the embodiments of the invention do not require a bypass adaptor.

The bypass adaptor embodiment shown in FIGS. 6a, 7a, and 7b mates to an oil filter housing much like the adaptor of FIGS. 3–4, and may have features similar to standard oil filters, like a central oil mounting hole 34, a seal groove 40, gripping surfaces, and the like. However, the bypass adaptor may include design variations as those of skill will appreciate, as it is not limited to the illustrated embodiment.

As shown in FIGS. 7a and 7b, the bypass adaptor may be assembled from multiple components. The embodiment of FIGS. 6a, 7a, and 7b comprises an outer cylindrical portion having one open end 63 and one closed end 65. An internal channel 67 may be affixed to the interior side of the closed end. In this regard, the internal channel, when assembled in the outer cylindrical portion, defines an oil inlet port 64 and an outlet port 66. The channel of the illustrated embodiment is assembled to the outer portion with two bolts, although other embodiments may use different types of fasteners. Still, other embodiments may not require fasteners, as the present invention is not limited to a bypass adaptor that is assembled from separate components. The internal fitting has internal threads that may mate to a central mounting stud of an oil filter housing. However, other configurations that provide a bypass channel may be constructed, as it is to be appreciated by those of skill.

In one illustrative embodiment, a kit of parts may be provided that includes components necessary to perform an oil flushing procedure for the lubrication system of a particular motorcycle. For example, in one embodiment, a kit may comprise the adaptor of FIGS. 3 and 4, a drain hose, and plug(s) for outlet(s) of the adaptor to perform an oil flushing procedure on a motorcycle having an EVOLUTION engine, as manufactured by HARLEY DAVIDSON. In another embodiment, a kit may be provided that comprises a bypass adaptor, a fitting having separable joint, a right angle fitting, and a drain line to perform an oil flushing procedure on a motorcycle having a TWIN CAM engine, as manufactured by HARLEY DAVIDSON. However, it is to be appreciated that other kits may be provided for the aforementioned engines or others, such as a general kit comprising parts for any lubrication system, or that the components may be sold separately as the invention is not limited in this regard.

In one illustrative embodiment of the invention, the method for flushing residual used oil is begun by running an engine to increase the oil temperature such that it is less viscous and thus more easily drained. After shutting the engine off, the oil tank 26 is drained and the oil filter 14 is removed. The oil tank 26 is then refilled with fresh oil. An adaptor 10, such as the one shown in FIGS. 3 and 4 is installed on the oil filter housing 12, and all but the lowest outlet of the adaptor are plugged while a drain hose 28 is connected to the lowest outlet 30. At this point, the engine 20 may be started, thereby causing the primary engine oil pump 24 to draw fresh engine oil from the oil tank 26 and deliver it through passageways of the engine 20, displacing any residual used oil remaining therein. Starting the engine may also cause a scavenging oil pump 22 to direct any residual used oil 11 that was in the dry sump 15 through the oil filter housing 12 and out of the engine through the adaptor 10. As residual oil from within the passageways of the engine and the oil line 19 between the oil tank 26 and engine 20 is drained into the dry sump 15, it will also be directed out of the engine through the adaptor. A user may observe when new oil has displaced much of the used oil from the system when new, relatively clear oil begins being discharged from the outlet 30. As this point, the user may turn the engine 20 off to end the flushing process. In one embodiment, the amount of used residual oil that will have been flushed from the lubrication system is approximately 24 to 32 ounces. Once the oil has been flushed, the adaptor may be removed, an oil filter 14 installed, and the oil tank 26 may be topped off to compensate for the flushed oil.

According to another embodiment of the invention, a lubrication system may be retrofitted by installing a fitting 48 having a separable joint 50 to provide a conveniently accessible outlet 30 during oil changes. To install the separable fitting, an oil line cover as found in some lubrication systems, such as those of motorcycle having a TWIN CAM engine, as manufactured by HARLEY DAVIDSON may need to be removed to expose oil lines 59 of the lubrication system. A hose 57 that returns oil from a scavenging pump 22 back to the oil tank 26 may then be trimmed by approximately ¼ inch to accommodate the fitting 48. Alternately, the hose 57 may be trimmed by another amount, or may even be replaced with an appropriately sized hose. A separable fitting 50, like the one shown in FIG. 6*b*, may be installed to an end of the hose 57 and also to a port 49 leading from the scavenging pump 22 of the engine 20. The oil line cover may be replaced for normal operation of the engine. To access the separable fitting 48 to provide an outlet 30 for flushing residual used oil, the oil line cover may be removed to expose the fitting for separation to create the outlet 30.

Another method of flushing oil, according to one embodiment, is begun by draining used oil from an oil tank 26 and removing the oil filter 14 from the oil filter housing 12. A bypass adaptor 62 is then installed onto the oil filter housing in place of the oil filter. An oil line cover may need to be removed to expose a separable fitting 48 on a line that returns oil from a scavenging pump 22 to the oil tank 26. The fitting is separated and then a right angle fitting 60, like that shown in FIG. 6*c*, may be installed on the portion of the separable fitting connected to the engine. A drain line 28 connected to the right angle fitting is then directed to a waste receptacle 16. The engine may be started so that the scavenging oil pump 22 of the engine flushes residual oil 11 through the outlet 30 and into the waste receptacle. As with the previously described method, a user may observe when fresh (relatively translucent) oil begins to be flushed from the system, thereby indicating that much of the residual used oil has been removed from the lubrication system. At this time, the user may turn the engine off to end the flushing process. The right angle fitting and bypass adaptor may then be removed, the separable fitting reconnected, and a new oil filter installed. At this point, the oil tank may be topped off, and the oil line cover replaced for normal engine operation.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of removing residual used oil from a lubrication system of an engine having a permanent primary oil pump as a component of the engine and a permanent scavenging oil pump as a component of the engine, the method comprising the acts of:
   draining used oil from an oil tank of the lubrication system;
   adding fresh oil to the oil tank;
   pumping the fresh oil through the lubrication system with the permanent primary oil pump of the engine to flush residual used oil from the lubrication system and into a dry sump of the engine; and
   pumping the residual used oil from the dry sump and out of the engine with the permanent scavenging oil pump of the engine.

2. The method of claim 1, further comprising an act of:
   replacing a used oil filter with an adaptor having an outlet to allow the residual used oil to be pumped out of the lubrication system.

3. The method of claim 2, further comprising an act of:
   plugging uppermost ports of the adaptor while leaving a lower most port open to provide the outlet to allow residual used oil to be pumped out of the lubrication system.

4. The method of claim 3, further comprising an act of:
   attaching a drain line to the lower most port to allow residual used oil to be directed to a waste receptacle upon being pumped out of the lubrication system.

5. The method of claim 4, wherein the drain line includes a clear portion to allow a user to observe when substantially all of the residual used oil has been pumped from the lubrication system.

6. The method of claim 1, further comprising an act of:
   separating a separable joint of a first fitting at a discharge port of the engine to provide an outlet to allow the residual used oil to be pumped out of the lubrication system.

7. The method of claim 6, further comprising an act of:
replacing a used oil filter with a bypass adaptor.

8. The method of claim 7, further comprising an act of:
installing a second fitting onto a portion of the first fitting to allow residual used oil to be directed away from the engine.

9. The method of claim 8, further comprising an act of:
attaching a drain line to the second fitting to allow residual used oil to be directed to a waste receptacle upon being pumped out of the lubrication system.

10. The method of claim 9, wherein the drain line includes a clear portion to allow a user to observe when substantially all of the residual used oil has been pumped from the lubrication system.

11. The method of claim 1, further comprising an act of:
stopping the scavenging pump by turning the engine off once substantially all of the residual used oil has been pumped from the lubrication system.

12. The method of claim 11, further comprising an act of:
adding make up oil to the oil tank to compensate for the residual used oil flushed from the lubrication system.

13. The method of claim 1, wherein the primary oil pump and the scavenging oil pump are gear pumps.

14. The method of claim 1, wherein the primary oil pump and the scavenging oil pump are gerotor pumps driven directly by a crankshaft of the engine.

15. A method of retrofitting a lubrication system having an oil line adapted to deliver oil from a dry sump of an engine to an oil tank, the method comprising acts of:
removing an original filling that provides a connection between the oil line and a port in the lubrication system;
connecting a first end of a replacement filling having a separable joint to the oil line; and
connecting a second end of the replacement filling to the port to retrofit the lubrication system.

16. The method of claim 15, further comprising an act of:
trimming material from the oil line prior to connecting the first end of the replacement filling to the oil line.

17. The method of claim 16, wherein the first end of the replacement filling comprises a barbed hose clamp joint.

18. The method of claim 17, wherein the second end of the replacement filling comprises ¼ inch pipe threads.

19. The method of claim 18, wherein the separable interface of the replacement filling comprises an AN #6 joint.

20. A kit of parts used to retrofit an engine, the kit comprising:
a first filling having a separable joint to provide an outlet from a lubrication system of the engine;
a bypass adaptor to mount to an oil filter housing of the engine;
a second filling to direct flushed oil away from the engine; and
a drain line to direct flushed oil into a waste receptacle.

21. The kit of parts according to claim 20, wherein the first fitting has an AN #6 separable joint, a barbed hose clamp joint, and ¼ inch NPT threads.

22. The kit of parts of claim 21, wherein the second fitting comprises a right angle fitting.

23. An adaptor for use in removing oil from an engine lubrication system by pumping the oil with a permanent primary oil pump of the engine and a permanent scavenging oil pump of the engine, the adaptor comprising:
a central mounting hole having internal threads configured to mate with a threaded protrusion of an oil filter housing on the engine; and
an oil passageway positioned radially outward of the central mounting hole to receive oil pumped from the engine, the oil passageway having at least a portion that extends substantially parallel to the central mounting hole, wherein the oil passageway is in direct fluid communication with the central mounting hole.

24. The adaptor of claim 23, further comprising:
a seal groove configured to accept a seal to prevent oil from leaking between the adaptor and the oil filter housing.

25. The adaptor of claim 24, further comprising:
a knurled outer surface of the adaptor to assist a user in gripping the adaptor.

26. The adaptor of claim 23, wherein the adaptor is a bypass adaptor.

27. The adaptor of claim 23, wherein the oil passageway is positioned around the central mounting hole.

* * * * *

UNITED STATES PATENT AND TRADEMARK OFFICE
CERTIFICATE OF CORRECTION

| | | |
|---|---|---|
| PATENT NO. | : 7,134,419 B2 | Page 1 of 1 |
| APPLICATION NO. | : 10/875702 | |
| DATED | : November 14, 2006 | |
| INVENTOR(S) | : Phil LaFleur | |

It is certified that error appears in the above-identified patent and that said Letters Patent is hereby corrected as shown below:

Claim 15, Col. 9, line 30, please delete "filling" and insert --fitting--

Claim 15, Col. 9, line 32, please delete "filling" and insert --fitting--

Claim 15, Col. 9, line 34, please delete "filling" and insert --fitting--

Claim 16, Col. 9, line 38, please delete "filling" and insert --fitting--

Claim 17, Col. 9, line 40, please delete "filling" and insert --fitting--

Claim 18, Col. 9, line 42, please delete "filling" and insert --fitting--

Claim 19, Col. 9, line 44, please delete "filllng" and insert --fitting--

Claim 20, Col. 10, line 3, please delete "filling" and insert --fitting--

Claim 20, Col. 10, line 8, please delete "filling" and insert --fitting--

Signed and Sealed this

Ninth Day of December, 2008

JON W. DUDAS
*Director of the United States Patent and Trademark Office*